United States Patent
Kapustein et al.

(10) Patent No.: US 12,026,244 B2
(45) Date of Patent: Jul. 2, 2024

(54) REGISTRATION OF DYNAMICALLY CREATED PACKAGED APPLICATIONS

(71) Applicant: Microsoft Technology Licensing, LLC, Redmond, WA (US)

(72) Inventors: Howard Scott Kapustein, Issaquah, WA (US); Adam Demont Braden, Woodinville, WA (US); Tanaka Francis Jimha, Bellevue, WA (US); Kevin Marc Kieselbach, Redmond, WA (US); Adam Stritzel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 494 days.

(21) Appl. No.: 16/592,638

(22) Filed: Oct. 3, 2019

(65) Prior Publication Data
US 2021/0103651 A1   Apr. 8, 2021

(51) Int. Cl.
*G06F 8/61*   (2018.01)
*G06F 9/445*   (2018.01)
(Continued)

(52) U.S. Cl.
CPC .............. *G06F 21/44* (2013.01); *G06F 8/62* (2013.01); *G06F 9/44505* (2013.01); *G06F 21/629* (2013.01)

(58) Field of Classification Search
CPC ........ G06F 21/44; G06F 8/62; G06F 9/44505; G06F 21/629
See application file for complete search history.

(56) References Cited

U.S. PATENT DOCUMENTS 8,301,903 B2 * 10/2012 MacFarlane .......... H04L 63/123
                                                            713/187
9,226,143 B2 * 12/2015 Kulkarni ............. H04W 12/041
(Continued)

FOREIGN PATENT DOCUMENTS

WO    2014193448 A1   12/2014

OTHER PUBLICATIONS

"International Search Report and the Written Opinion Issued in PCT Application No. PCT/US2020/046871", dated Nov. 16, 2020, 13 Pages.
(Continued)

*Primary Examiner* — Wei Y Zhen
*Assistant Examiner* — Brahim Bourzik

(57) ABSTRACT

The present disclosure concerns methods and systems for registering dynamically created packaged applications with an operating system. A dynamically created packaged application may not include a way to authenticate the packaged application but may declare a dependency on a host package. The host package may include a verified signature and be registered with the operating system. The host package may include a host runtime that references an executable included in the host package. The packaged application may not include executable files but may reference the host runtime. The operating system may register the packaged application based in part on its dependency on the host package. When the packaged application is activated, the packaged application may invoke the host runtime and the executable but do so with an application identity of the packaged application. The application identity may be different from a host runtime identity of the host runtime.

20 Claims, 10 Drawing Sheets

(51) Int. Cl.
*G06F 21/44* (2013.01)
*G06F 21/62* (2013.01)

(56) References Cited

U.S. PATENT DOCUMENTS

| | | | | |
|---|---|---|---|---|
| 9,390,241 | B2* | 7/2016 | Swingler | G06F 21/60 |
| 9,542,219 | B1* | 1/2017 | Bryant | G06F 9/5077 |
| 10,083,054 | B2* | 9/2018 | Thomas | G06F 8/61 |
| 11,474,801 | B1* | 10/2022 | Karppanen | G06F 8/61 |
| 2004/0060045 | A1* | 3/2004 | Hind | G06F 8/62 |
| | | | | 717/174 |
| 2004/0078565 | A1* | 4/2004 | Hofmeister | G06F 21/51 |
| | | | | 713/156 |
| 2008/0140958 | A1* | 6/2008 | Yates | G06F 21/6281 |
| | | | | 726/17 |
| 2013/0139182 | A1* | 5/2013 | Sethuraman | G06F 9/44505 |
| | | | | 719/320 |
| 2013/0139271 | A1* | 5/2013 | Arrelid | G06F 21/10 |
| | | | | 726/27 |
| 2014/0040879 | A1 | 2/2014 | Goldman | |

OTHER PUBLICATIONS

"Progressive Web Applications", Retrieved From: https://web.archive.org/web/20190731024851/https://en.wikipedia.org/wiki/Progressive_web_applications, Retrieved on: Jul. 31, 2019, 6 Pages.

* cited by examiner

REGISTRATION OF DYNAMICALLY CREATED PACKAGED APPLICATIONS

CROSS-REFERENCE TO RELATED APPLICATIONS

N/A

BACKGROUND

Progressive web applications are a type of application delivered through the internet. One goal of progressive web applications is to help developers build cross-platform applications more easily than may be possible with native applications. Progressive web applications may be built using languages associated with websites. Such languages may include hypertext markup language (HTML), cascading style (CSS), and JavaScript. Progressive web applications may work on any platform or operating system that uses a standards-compliant browser.

Progressive web applications may have functionality—such as offline access, push notifications, home-screen installation, and device hardware access—that enables users to experience the applications similar to how users experience native applications. A progressive web application may fit on any form of device (whether a desktop, mobile, or tablet) and may not require re-downloading of content once initially loaded. Progressive web applications may be considered a type of webpage. As a result, developers may not be required to distribute progressive web applications through platform specific stores or controlled distribution channels.

SUMMARY

In accordance with one aspect of the present disclosure, a computer-readable medium is disclosed. The computer-readable medium includes instructions that are executable by one or more processors to cause a computing system to receive a request to register a client package. The client package is unsigned and specifies a dependency on a host package. The host package is signed and includes an executable. The host package is registered with an operating system. The host package has access to a function of the operating system. The computer-readable medium also includes instructions that are executable by one or more processors to register, by the operating system, the client package. The computer-readable medium also includes instructions that are executable by one or more processors to receive a request to activate an application included in the client package and cause, upon receiving the request, execution of the executable. The computer-readable medium also includes instructions that are executable by one or more processors to grant the application access to the function of the operating system.

The application may have an application identity and the execution of the executable may be done using the application identity.

The application identity may not conflict with a host identity of the host package.

The computer-readable medium may further include additional instructions that are executable by the one or more processors to cause the computing system to track, upon the execution of the executable, activity of the application and the executable using the application identity.

The client package may include an unsigned marker and the unsigned marker may be required for the operating system to register an unsigned package.

The computer-readable medium may further include additional instructions that are executable by the one or more processors to cause the computing system to receive, from the application, a second request to access a second function of the operating system. The host package may not have access to the second function. The computer-readable medium may further include additional instructions that are executable by the one or more processors to deny the application access to the second function.

The computer-readable medium may further include additional instructions that are executable by the one or more processors to cause the computing system to uninstall, by the operating system, the host package. The computer-readable medium may further include additional instructions that are executable by the one or more processors to cause the computing system to uninstall, upon the uninstalling the host package, the client package.

The client package may have been created by a second application included in the host package.

The host package may include a host capability and the host capability may be required for the operating system to register the client package.

The client package may have been created by a developer or a system administrator after the host package was signed.

The computer-readable medium may further include additional instructions that are executable by the one or more processors to cause the computing system to determine that the host package satisfies criteria. The criteria may be included in the dependency specified in the client package.

The client package may not contain executable files or references to binaries or classes other than the host package.

In accordance with another aspect of the present disclosure, a computer-readable medium is disclosed. The computer-readable medium may include instructions that are executable by one or more processors to cause a computing system to request, upon activation of an application, execution of an executable with an application identity of the application. The executable is included in a host package and the application is included in a client package. The host package is signed and includes a host identity. The host package is registered with an operating system and includes a capability that allows access to a function of the operating system. The client package is unsigned and declares a dependency on the host package. The application identity is distinct from the host identity. The computer-readable medium may also include instructions that are executable by the one or more processors to cause a computing system to receive, during a runtime of the application, access to the function of the operating system.

The computer-readable medium may further include additional instructions that are executable by the one or more processors to cause the computing system to request registration of the client package with the operating system. The host package may include a host capability. The host capability may be required for the client package to be registered with the operating system.

The client package may include an unsigned marker. The unsigned marker may be required for the registration of the client package with the operating system.

The computer-readable medium may further include additional instructions that are executable by the one or more processors to cause the computing system to fail to receive access to a second function of the operating system. The host package may not have access to the second function of the operating system.

The host package may cause the client package to be uninstalled.

In accordance with another aspect of the present disclosure, a computer-readable medium is disclosed. The computer-readable medium includes instructions that are executable by one or more processors to cause a computing system to receive a request to activate a client application. The client application does not include a signature for an operating system to verify authenticity of the client application. The client application has a client identity. The client application declares a dependency on a host application. The host application includes a signature for the operating system to verify authenticity of the host application, and the host application has a host identity different from the client identity. The computer-readable medium also includes instructions that are executable by one or more processors to cause a computing system to cause, upon receiving the request, activation of the host application under the client identity. The computer-readable medium also includes instructions that are executable by one or more processors to cause a computing system to grant the client application access to a function of the operating system. The host application has access to the function.

The computer-readable medium may further include additional instructions that are executable by the one or more processors to cause the computing system to deny the client application access to a second function of the operating system. The host application may not have access to the second function.

The client application may have been generated by the host application after the host application was signed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
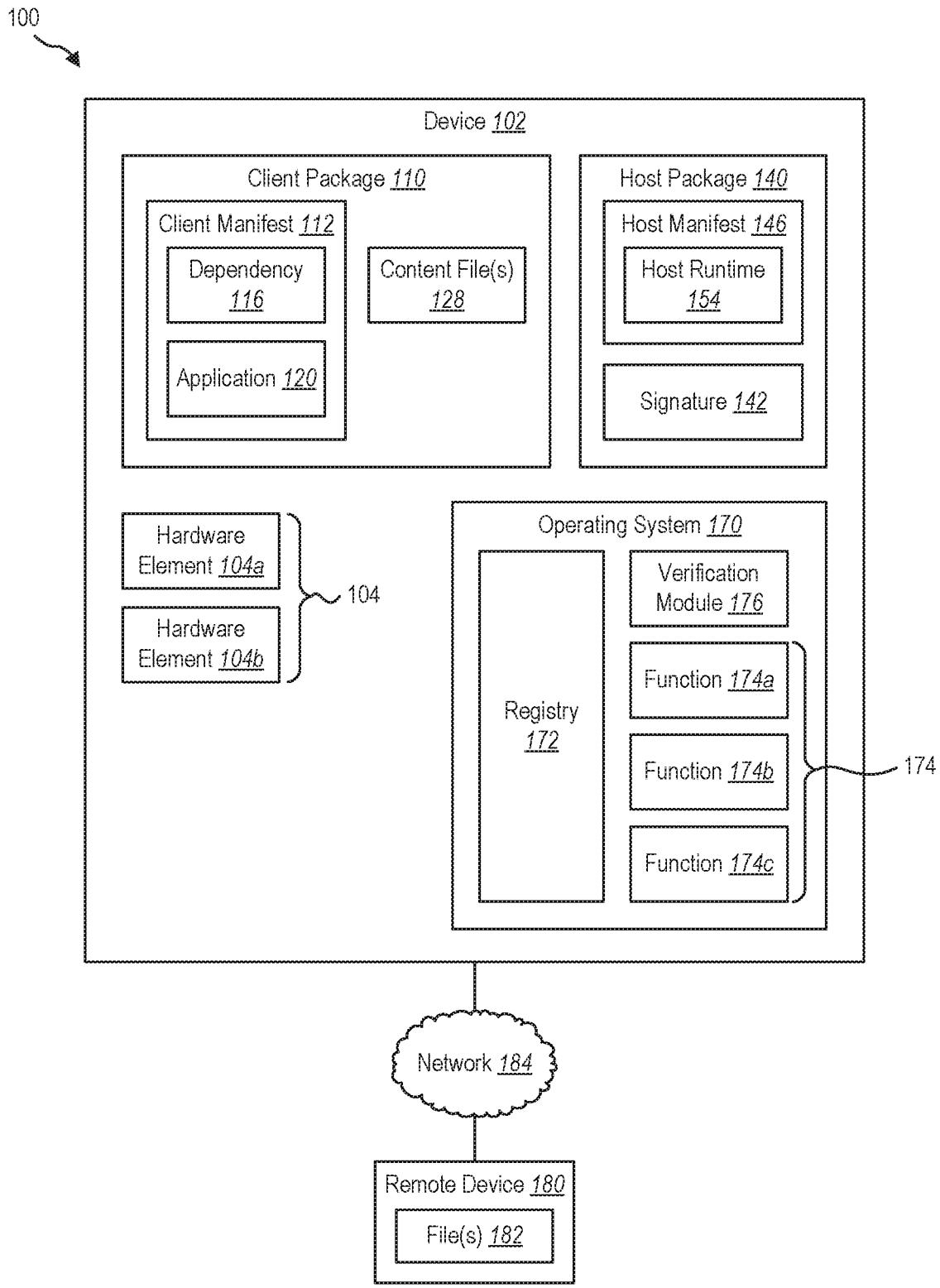
FIG. 1 illustrates an example system for registering an unsigned client package in accordance with the present disclosure.

An operating system may control what packages (which may contain zero or more applications) are registered with the operating system and what applications are permitted to run on a system. Registering packages with the operating system may include recording information about the packages and may be a way for the operating system to track what programs and executables are on the system and what they are doing. Applications not associated with a registered package may not be permitted to run on the system. Once packages are registered with the system, the operating system may grant applications included in the packages access to certain system functions. System functions may include providing notifications to the user, accessing system applications (such as a photo library), or accessing a hardware element of the device (such as a camera). Granting applications access to functions of the operating system may enrich the functionality of the applications and improve the user's experience with the applications and the operating system or platform on which they run. At the same time, however, allowing applications to run on the system and granting them access to operating system functions may create security concerns. Giving an application access to the system creates the potential for the application to harm the system.

One way a system may try to protect itself from malicious programs and files is through signing. Signing is a method for verifying that a package is authentic (is what it purports to be or comes from a trusted source) and has integrity (has not been changed). Signing may involve the use of two keys or certificates. The certificates may be created by an operating system or platform developer. The first certificate may be a private certificate that is not shared publicly. The operating system developer may receive a package from a third-party developer and, after reviewing the package, sign the package using the private certificate. In the alternative, the operating system developer may share the private certificate with a trusted third-party developer, and the third-party developer may sign its package using the private certificate. The second certificate may be publicly available and distributed on machines running the operating system developer's operating system. Before installing the package, the operating system may verify the authenticity of the package using the public certificate. If the package has been modified since the package was signed with the private certificate, the public key will not verify its authenticity. Signing provides one mechanism for verifying the authenticity and integrity of a package before installing the package on a system and granting it access to functions of the operating system.

Even though signing improves security, it creates difficulties in using dynamically created content, such as content generated while a system is running. As noted above, signing requires a certificate that must be kept private and cannot be present on a runtime machine. But consider a situation where a signed application running on a machine generates, during runtime, a new application package. For example, consider a situation where an internet browser running on the machine generates an application package based on a website accessible through the internet. The internet browser may generate the application package to allow a user to experience the website without having to use the internet browser and without having to be connected to the internet. To get the new application package signed, however, would require that the application package be shared with someone who possesses the private certificate for the signed application. That would significantly delay a user's access to the new application.

One way to provide dynamically created packaged applications access to the system and operating system functions without requiring a signature (but while still protecting the system) is through the use of a host package. The host package may be a trusted package that acts as a gateway through which a client package (which may be a dynamically created package) can be registered with the operating system and gain access to operating system functionality. The host package and the client package may have certain characteristics that facilitate use of dynamically created packaged applications while still protecting the system.

Because the client package may be dynamically created, the client package may not include a signature. The lack of signature may mean that the operating system lacks a way to authenticate the client package. The operating system may therefore require that the client package state a dependency on the host package. The dependency may act to link the client package to the host package. The dependency may also include criteria. The criteria may include a name of the host package and a minimum version of the host package. The criteria may include other defining characteristics. For example, the host package may be identified by a name, a version, a publisher/author, resources (language, region, etc.), bitness, or architecture or central processing unit support. The criteria may require that content of the host package be encrypted, compressed, or physically present on a particular volume or device. The criteria may require that the host package have certain declared capabilities, have particular functionality, or include a particular key, tag, or identifier. The operating system may refuse to install the client package or allow any of its applications to run on the system if the host package identified in the dependency does not contain an authenticated signature, is not registered with the operating system, or does not satisfy the criteria included in the dependency. In this way, the operating system at least knows that the gateway through which the client package is going to access the system is authentic.

The operating system may allow the client package to include content files but may not allow those content files to include any executable files. In the alternative, the client package may not be permitted to reference or execute any executable files contained in the client package. The operating system may also require that the client package not contain extensions referencing binaries or classes other than those contained in the host package. These restrictions may alleviate some security concerns with respect to allowing unsigned packages on the system. The operating system may require that an application in the client package reference a host runtime contained in the host package. The application may refer to the host runtime using a host runtime identity of the host runtime. The host runtime of the host package may include activation information. The activation information may tell the operating system what to do when the application invokes the host runtime. The activation information may include a reference to an executable included in the host package. When an application in the client package is activated, the operating system may use the activation information contained in the host runtime and invoke the executable of the host runtime. The executable may then use the content files of the client package. In this way, the client package acts as an extension of the host package. The client package may include new content but is limited to using executables included in the host package.

Once registered with the operating system, the host package may receive access to certain operating system functions. Capabilities included in the host package may determine what functions the host package can access. The operating system may require that a user give consent before an application included in the host package can use a capability. For example, if a host package includes a capability for accessing a camera of a device, when an application included in the host package tries to access the camera, the operating system may require that the user agree to give the application access. The host package may also have a certain trust level with respect to the operating system. The trust level may indicate a level of access the host package has to operating system functionality. The operating system developer may control what capabilities third-party developers can include in a host package. The capabilities and the trust level of the host package may apply to and limit any client packages that depend on the host package. For example, the operating system may refuse to give the client package access to functionality to which the host package does not have access. Moreover, the client package may not be able to override the limits imposed by the host package.

The client package and any of its applications may each have unique identity as compared to other entities and objects on a system. Moreover, when an application in the client package is activated, the application may cause the operating system to invoke an executable in the host package but do so using an application identity of the application. Thus, even though applications included in the client package use executables included in the host package, the operating system can track activity of the applications included in the client package separate from the host package and its applications.

The host package may include a hosting capability that gives the host package permission to have client packages that depend on the host package. The operating system may refuse to register client packages that depend from a package that does not include the hosting capability. In the alternative, the operating system may register client packages that depend from a package that does not include the hosting capability as long as the package has a certain trust level with the operating system. The operating system developer may control what developers receive access to the hosting capability and trust levels that allow host packages to have dependent client packages. Thus, the custom capability and the trust level provide a mechanism to protect the operating system while opening the door for dynamically created content to gain access to the system.

The client package may include an unsigned marker. The unsigned marker may indicate that the client package does not include a signature. The operating system may refuse to install an unsigned package that does not include the unsigned marker. The operating system developer may control access to the unsigned marker. In this way, the operating system developer may limit who and what can create unsigned packages that can gain access to a system.

The operating system may require that the host package be able to uninstall all client packages that depend on the host package. The operating system may also require that when the host package is uninstalled, all client packages that depend on the host package be uninstalled. The operating system may also require that when a client package is uninstalled, the host package clean up the client package's artifacts.

The use of host packages and client packages as described herein facilitates the use of dynamically created applications in a way that still protects a system against harmful packages and files. The operating system delegates a certain measure of power and responsibility for protecting the system to the host package. But it may do so only if the host package and the client package satisfy certain criteria. The host package may also handle remediation for badly behaved client packages. Even though the client package need not be signed, it must still depend from an authenticated host package and may be limited to the functionality of the host package.

FIG. 1 illustrates an example of a system 100 in which the techniques disclosed herein may be utilized. The system 100 may include a device 102 that includes a client package 110 and a host package 140 in accordance with the present disclosure. The device 102 may be any type of computing device or system. For example, the device 102 could be a desktop computer, a mobile phone, or a distributed computing system made up of multiple nodes. The device may have one or more users. The device 102 may be managed by a system administrator. The device 102 may also include an operating system 170.

The client package 110 may be a collection of files and data created for installation on a computing device, such as the device 102. The client package 110 may have been generated during operation of the device 102. The client package 110 may have been generated by the host package 140 or the operating system 170. In the alternative, the client package 110 may have been generated by a developer (which may be the same as or different from a developer of the host package 140). The developer may have generated the client package 110 after generating the host package 140. In the alternative, the client package 110 may have been generated by a system administrator. The system administrator may be a person with some level of administrative control over or administrative access to the device 102. In the alternative, the client package may have been generated by a user of the device 102. The system administrator or the user may have generated the client package 110 after the host package 140 was generated and after the host package 140 was installed on the device 102.

The client package 110 may include a client manifest 112, content files 128, and an application 120. The client package 110 may not include a signature or any other object that would allow the operating system 170 to authenticate the client package 110. The client package 110 may not include any executable files. Although the client package 110 shown in FIG. 1 includes only the application 120, other client packages may include multiple applications.

Although the client package 110 may not include a signature, there may be situations in which a dynamically created client package does include a signature or authenticating object. For example, an application included in a host package may dynamically create a client package, seek temporary access to a private certificate for use to sign the client package, and then the client package can be installed as a signed package. The application may ask the user to insert a USB flash key containing the private certificate. The application may ask the user for credentials to access a remote machine that includes the private certificate. The user may authorize a phone or mobile device of the user to provide the private certificate.

The client manifest 112 may include metadata regarding the client package 110 and information contained in the client package 110. The client manifest 112 may describe the application 120. The operating system 170 or a developer of the operating system 170 may dictate the type of information that should or may be included in the client manifest 112. The operating system 170 or a developer of the operating system 170 may dictate the format of the information included in the client manifest 112. The operating system 170 may use the client manifest 112 and information contained in the client manifest 112 to determine whether to install the client package 110 and in the process of installing the client package 110. The operating system 170 may use the client manifest 112 or information contained in the client manifest 112 when the application 120 is activated.

The client manifest 112 may include a dependency 116. The dependency 116 may indicate a separate package (such as the host package 140) on which the client manifest 112 relies. The dependency 116 may include sufficient information about the host package 140 such that the operating system 170 can determine whether or not a package is the host package 140 indicated in the dependency 116. The client package 110 may depend on the host package 140 for purposes of registering with the operating system 170. The client package 110 may also depend on the host package 140 for access to one or more executables. The dependency 116 may identify the host package 140.

Although the client manifest 112 includes only the dependency 116, in other designs a client manifest may include multiple dependencies. In situations involving multiple dependencies, the operating system 170 may first determine whether there is a package registered with the operating system 170 that satisfies a first listed dependency. If not, the operating system 170 may move on to a second listed dependency. The operating system 170 may continue until a dependency is satisfied or the operating system 170 has exhausted all the dependencies included in the client manifest.

In some designs, a client manifest of a client package may not include a dependency. In those situations, a client package may not have access to functionalities and capabilities of a host package.

The application 120 may describe, reference, or include a set of files and information that work together for a particular purpose or to perform certain functions, tasks, or activities. The application 120 may include an application identity that uniquely identifies the application 120. The application 120 may not include or reference an executable included in the client package 110. Instead, the application 120 may include a reference to a host runtime 154 included in the host package 140. The reference to the host runtime 154 may be used when the application 120 is activated. The reference may indicate that the operating system 170 should invoke the host runtime 154 when the application 120 is activated.

The application 120 may indicate that, when the application 120 is activated, the operating system 170 should invoke the host runtime 154 using the application identity.

The application 120 may reference the content files 128. The content files 128 may be used during runtime of the application 120. Thus, the host runtime 154 and any executables referenced in the host runtime 154 may use the content files 128 contained in the application 120. For example, the host runtime 154 may use the content files 128 to create a user interface. Such a user interface may be different from what applications contained in the host package 140 would create using content contained in the host package 140.

The host package 140 may be a collection of files and data created for distribution to and installation on a computing device, such as the device 102. The host package 140 may have been generated by a developer (which may be the same as or different from a developer of the operating system 170). The host package 140 may include zero or more applications. An application may be a set of files and information that work together for a particular purpose or to perform certain functions, tasks, or activities.

The host package 140 may include metadata files and content files. The metadata files may include information about the host package 140 and its identity, contents, and functionality. The metadata files may include bookkeeping files. The operating system 170 may use metadata files to understand what is included in the host package 140 and what to do with the host package 140 when the host package 140 is installed and applications contained in the host package 140 are activated. The content files in the host package 140 may be used during runtime of applications contained in the host package 140.

The host package 140 may include a host manifest 146. The host package 140 may include only a single manifest, such as the host manifest 146. The host manifest 146 may include metadata regarding the host package 140 and the information and files contained in the host package 140. The host manifest 146 may describe zero or more applications. The host manifest 146 may include a host runtime 154. The host runtime 154 may be accessible by packages other than the host package 140 and applications other than those included in the host package 140.

The host runtime 154 may include activation information. The activation information may reference an executable. The operating system 170 may use the activation information when the host runtime 154 is invoked. Thus, when the host runtime 154 is invoked, the operating system 170 may run the executable. The host runtime 154 may include a host runtime identity that uniquely identifies the host runtime 154. The application 120 included in the client package 110 may reference the host runtime identity in order to cause the operating system 170 to invoke the host runtime 154 when the application 120 is activated.

The host manifest 146 may indicate that the host package 140 or the host runtime 154 have certain capabilities. The capabilities may include access to certain functions of the operating system 170 (such as function 174a and function 174b).

The host package 140 may include a signature 142. The developer of the host package 140 may have generated the signature 142 (which may also be referred to as signing the host package 140) after creating the host package 140 but before distributing the host package 140 to the device 102. The signature 142 may have been created using a key or certificate. The key or certificate used to create the signature 142 may be a private key or certificate. The operating system developer may have generated the private key. The operating system developer may share the key or certificate used to sign the host package 140 only with trusted developers. Moreover, the key or certificate used to sign the host package may not reside on the device 102. The signature 142 may be created by giving the host package 140 and a private key to a signing algorithm. The operating system 170 may use the signature 142 to verify the authenticity and integrity of the host package 140. The operating system 170 may have a public key that verifies that the signature 142 was generated using the private key and that the host package 140 was not modified since signing.

The operating system 170 may be a program or platform that manages hardware (such as hardware elements 104) and software on a computing device, such as the device 102. The operating system 170 may include a registry 172. The operating system 170 may use the registry to track and manage the packages, applications, and processes on the device 102. The operating system 170 may place information about a package or application on the registry 172 at the time the operating system 170 installs the package or application on the device 102. The operating system 170 may not invoke or execute applications that have not been registered or whose associated packages have not been registered with the operating system 170.

The operating system 170 may include a verification module 176. The verification module 176 may allow the operating system 170 to verify a package's claim to authenticity. The verification module 176 may use a signature included with a package (such as the signature 142) to determine that a package is authentic. The verification module 176 may include a public key or certificate. The verification module 176 may include a signature verifying algorithm that receives a package (such as the host package 140), a public key, and a signature (such as the signature 142) and determines whether the package is authentic.

The operating system 170 may receive requests to install a package. Installing a package may include indexing, staging, and registering. Indexing may include the operating system 170 analyzing a manifest of the package and recording information about the package. Staging may include the operating system 170 making a directory for the package's contents, placing contents of the package in the directory, and recording a location of the directory. Registering may include the operating system 170 connecting the package to a specific user. Registering a package may also refer more broadly to the process of the operating system 170 learning properties of a package and recording those properties. Registering a package may also refer to the operating system 170 acknowledging a package and allowing the package and applications included in the package to exist and run on a system. The operating system 170 may receive a request to register the client package 110 from the client package 110. In the alternative, the operating system 170 may receive a request to register the client package 110 from the host package 140. The operating system 170 may refuse to invoke or run applications and files not associated with a registered package.

The operating system 170 may refuse to register packages that do not include a verifiable signature except that the operating system 170 may register unsigned packages that indicate dependence on a registered package that includes a verifiable signature. For example, assume that the dependency 116 of the client package 110 indicates that the client package 110 depends on the host package 140. Assume further that the host package 140 has not yet been registered with the operating system 170. In that situation, the operating system 170 may reject a request to register the client package 110 with the operating system 170. In the alternative, assume that the host package 140 has been registered with the operating system 170 and that the operating system 170 has verified the signature 142 (which may be part of a process of registering the host package 140). In that situation, the operating system 170 may register the client package 110. The operating system 170 may also require that the identity of the client package 110 not conflict with the identity of the host package 140 in order to register the client package 110. The operating system 170 may also require that the application identity of the application 120 and the identity of the host runtime 154 not conflict in order to register the client package 110.

The operating system 170 may also register unsigned packages if a user confirms that the user wants to install the unsigned package. The user may indicate that the user wants to install the unsigned package in response to a prompt created when the user asked to install the unsigned package. The user may also indicate that the user wants to install the unsigned package by changing a system setting that allows for installation of unsigned packages. The operating system 170 may require authentication of the user before installing the unsigned package. For example, the operating system 170 may require that the user enter a password or satisfy two-factor authentication.

The operating system 170 may uninstall packages. Uninstalling a package may include de-registering a manifest of the package. For example, uninstalling the client package 110 may include de-registering the client package 110 from the registry 172. Uninstalling the host package 140 may result in the operating system 170 also uninstalling the client package 110. When the operating system 170 uninstalls only the client package 110, the host package 140 may be notified to clean up any artifacts of the client package 110.

The operating system 170 may include functions 174. Invoking one or more of the functions 174 may allow an application to access certain capabilities or functionalities of the device 102. For example, the functions 174 may allow an application to access hardware element 104a (which may be a camera) or hardware element 104b (which may be a microphone) of the device 102. Invoking the functions 174 may also allow an application to access or modify files existing outside the application or the application's associated package. For example, the functions 174 may allow an application to access a library of photographs stored on the device 102 or cause an icon to be placed on a home screen of the device 102. The functions 174 may also give the application access to memory of the device 102 or to other applications.

The operating system 170 may receive a request to access one of the functions 174, such as function 174a. The operating system 170 may deny the request if the requesting application does not have a capability (or the application's associated package does not have a capability) granting the application access to the function 174a. In contrast, the operating system 170 may grant the request if the requesting application (or its associated package) has a capability granting the application access to the function 174a. For example, assume the host package 140 includes a capability granting the host package 140 access to the function 174a but that the host package 140 does not include a capability granting the host package 140 access to the function 174c. If an application included in the host package 140 requests access to the function 174a, the operating system 170 may grant the application access to the function 174a. But if the application included in the host package 140 requests access to the function 174c, the operating system 170 may deny the application access to the function 174c.

The operating system 170 may receive a request from the client package 110 to access the function 174a. The operating system 170 may use a rule to determine whether the client package 110 can access the function 174a. One possible rule is that the operating system 170 may require that both the client package 110 and the host package 140 each include a capability for the function 174a in order for the application 120 to access the function 174a (an intersection rule). Another possible rule is that the operating system 170 may grant the client package 110 or the application 120 access to the function 174a if either the host package 140 or the client package 110 includes a capability for the function 174a (a union rule). Another possible rule is that the operating system 170 may allow the host package 140 to determine whether the client package 110 or the application 120 can access the function 174a (a host-restricted rule). Another possible rule is that the operating system 170 may grant the client package 110 access to the function 174a as long as the client package 110 includes a capability for the function 174a, regardless of whether the host package 140 includes the capability (a client-declared rule). These rules may not be mutually exclusive. For example, the host package 140 may include multiple sets of capabilities. The host package 140 may include a first set of capabilities for use when an application included in the host package 140 is running with an identity included in the host package 140, a second set of capabilities required by the client package 110 when an application included in the host package 140 is running with an identity included in the client package 110, and a third set of capabilities that are optionally available to the client package 110 when an application included in the host package 140 is running with an identity included in the client package 110. The third set of capabilities may include express capabilities or may grant the client package 110 the ability to declare capabilities not declared in the host package 140.

The system 100 may include a remote device 180. The remote device 180 may be physically separate from the device 102. The remote device 180 may include files 182. The files 182 may include executable files and content files. The remote device 180 may be connected to a network 184. The device 102 may be connected to the network 184 and may access the files 182 on the remote device 180 through the network 184. The host runtime 154 or the executable referenced by the host runtime 154 may include instructions to access the files 182 during runtime. In this way, the application 120 included in the client package 110 may invoke a program stored on the remote device 180. For example, the remote device 180 may include a word processing program, and the host runtime 154 or the executable referenced by the host runtime 154 may include instructions to invoke the word processing program stored on the remote device 180. Activating the application 120 included in the client package 110 may invoke the word processing program included on the remote device 180.

Figure 2:
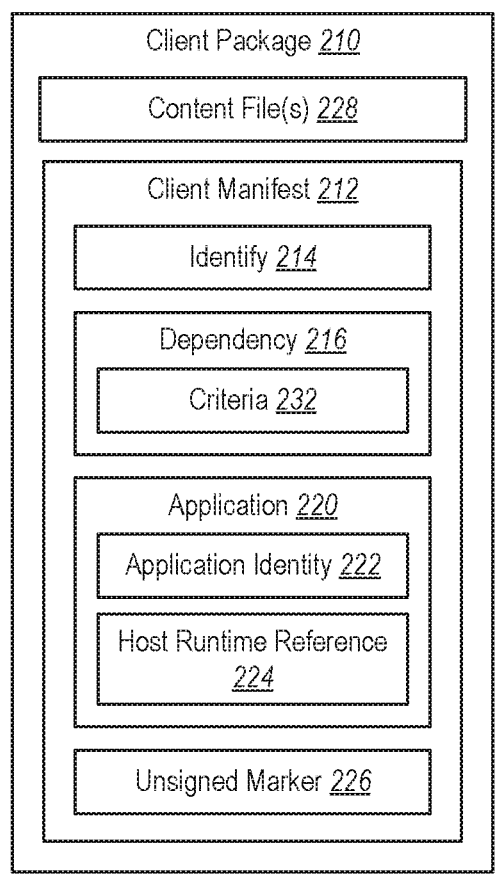
FIG. 2 illustrates an example client package in accordance with the present disclosure.

FIG. 2 illustrates an example of a client package 210 in accordance with the present disclosure.

The client package 210 may be a set of files and data intended for installation on a computing device (such as a cell phone, a desktop computer, or an access terminal). The client package 210 may not include executable files or extensions referencing binaries or classes other than those contained in a host package on which the client package depends. The client package 210 may be generated while the computing device is operating, such as by an application on the computing device. In this way, the client package 210 may be dynamically generated. The client package 210 may also be generated by a developer, a system administrator, a user, or an operating system.

The client package 210 may include content files 228. The content files 228 may be any type of file that a computing device can process other than an executable file. Executable files may include a dynamic link library file. The content files 228 may include images (such as JPEGs and TIFFs), sound files (such as an MP3 file), video files, data files, text files, HTML files, scripts, and documents. The content files 228 may be used by an application or an executable. For example, an application or an executable may use the content files 228 to create a user interface.

The client package 210 may include a client manifest 212. The client manifest 212 may be a metadata file that contains information about the client package 210 and the files included in the client package 210. The type of information and the format of the information contained in the client manifest 212 may be dictated by an operating system or platform or a developer of the operating system or platform.

The client manifest 212 may include a client identity 214. The client identity 214 may be information that the operating system can use to identify and track the client package 210. The client identity 214 may include a name, a publisher, and a version. The client identity 214 may include an object identifier (OID). The object identifier may be a unique name for the client package 210. The client identity 214 may be unique as compared to other OIDs associated with objects and entities on a device on which the client package 210 is located or installed. An operating system may use the client identity 214 to track and manage the client package 210 and any applications associated with the client package 210.

The client manifest 212 may include a dependency 216. The dependency 216 may specify a package or application on which the client package 210 depends or relies. The dependency 216 may specify the package using an OID of the package or other information about the package. The package on which the client package 210 depends may be referred to as a host package. The dependency 216 may include criteria 232. The criteria 232 may describe requirements that a package or application must satisfy in order for an operating system to resolve the dependency 216 and install the client package 210 on a device. For example, the dependency 216 may specify a particular package as a host package of the client package 210. The criteria 232 may specify a minimum version of the host package that the client package 210 is willing to accept or with which the client package 210 is compatible.

The client manifest 212 may include an unsigned marker 226. The unsigned marker 226 may be a string of characters. The unsigned marker 226 may indicate that the client package 210 is unsigned. An operating system may refuse to install unsigned packages, such as the client package 210, that do not include the unsigned marker 226. The operating system or a developer of the operating system may define a value for the unsigned marker 226.

The client manifest 212 may define an application 220. Although the client manifest 212 is shown to define only the application 220, in other designs a client manifest may define multiple applications. The application 220 may not include an executable or a reference to an executable included in the client package 210. Instead, the application 220 may include a host runtime reference 224 that specifies a host runtime included in a host package. The host runtime reference 224 may specify the host runtime using a host runtime identity of the host runtime. The host runtime may include activation information and reference an executable included in the host package. Activating the application 220 may invoke the host runtime specified in the application 220 and thus the executable referenced in the host runtime. The application 220 may reference the content files 228.

The application 220 may include an application identity 222. The application identity 222 may be information that identifies the application 220. The application identity 222 may include an OID for the application 220. The application identity 222 may be distinct from all other OIDs for objects and entities existing on a device on which the application 220 resides. An operating system may use the application identity 222 in invoking the host runtime identified in the application 220. In other words, activating the application 220 may invoke the host runtime and any executables referenced in the host runtime but do so with the application identity 222. In this way, the operating system may be able to track activity of the host runtime and any executables referenced in the host runtime as activity of the application 220 and the client package 210.

The client package 210 may request to be registered with an operating system. The operating system may not register the client package 210 unless the client package 210 and a host package satisfy certain criteria (some of which have been described above). For example, the operating system may refuse to install the client package 210 if the client package 210, as an unsigned package, does not depend on a host package. As another example, the operating system may refuse to install the client package 210 if the client package 210 depends on a host package that does not include a verified signature or that has not been registered with the operating system. As another example, the operating system may refuse to install the client package 210 if the client package 210 includes any executable files. In the alternative, in a situation in which the client package 210 includes an executable file, the operating system may not refuse to install the client package 210 based solely on the inclusion of the executable file. Instead, the operating system may refuse to install the client package 210 if the client manifest 212 or the application 220 references any executable files included in the client package 210. In the alternative, the operating system may still install the client package 210 but refuse to execute any executable files included in the client package 210. In the alternative, the host runtime referenced in the application 220 may refuse to run or invoke the executable files included in the client package 210. The operating system may require that any activatable extensions in the client package 210 or the application 220 reference a host package or a host runtime.

When a user uninstalls the client package 210, the operating system may de-register the client manifest 212. The operating system may also notify the host package to clean up artifacts of the client package 210.

When a change to the client package 210 is made (such as updating the client package 210, remediating the client package 210, disabling the client package 210, enabling the client package 210, or uninstalling the client package 210), the operating system may notify the host package.

Figure 3:
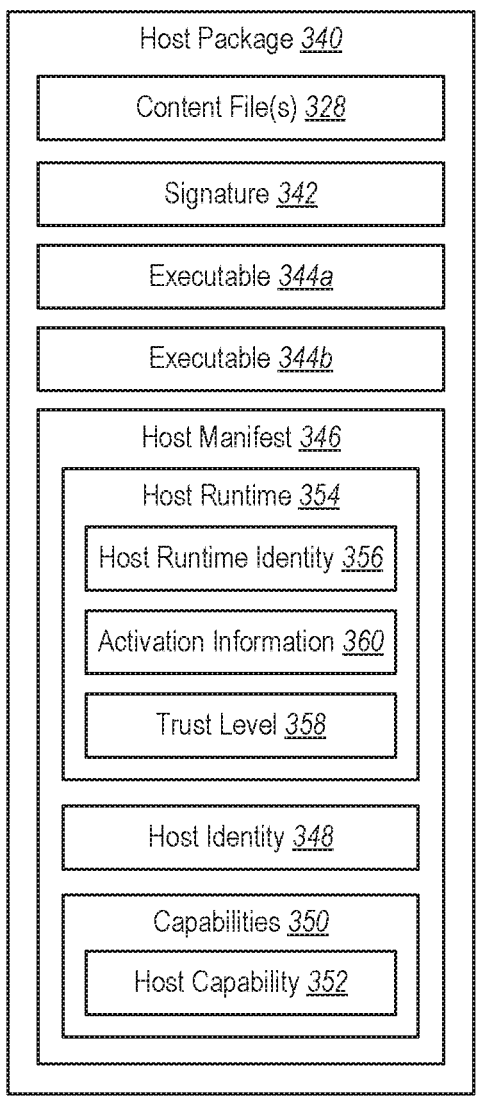
FIG. 3 illustrates an example host package in accordance with the present disclosure.

FIG. 3 illustrates an example of a host package 340 in accordance with the present disclosure.

The host package 340 may be a set of files and data intended for distribution to and installation on a computing device (such as a cell phone, a desktop computer, or an access terminal). The host package 340 may be generated by a developer.

The host package 340 may include a signature 342. The signature 342 may have been created using a private key.

The private key may not reside on a device where the host package 340 is located. The signature 342 may allow a device or an operating system to determine that the host package 340 is authentic and has not been modified. For example, the device where the host package 340 is located may include a public key. The public key may allow the device to verify that the signature 342 was generated using the private key and that host package 340 is authentic and has not been modified since it was signed. The signature 342 is one way that an operating system may verify the authenticity of the host package 340. The operating system and the host package 340 may use other ways to verify authenticity in other designs.

The host package 340 may include executables 344a, 344b. The executables 344 may be files that are capable of being executed on a computing device. The executables 344 may refer to and use content files 328 included in the host package 340. The executables 344 may use files not included in the host package 340.

The host package 340 may include a host manifest 346. The host manifest may be a metadatafile that contains information regarding the host package 340 and files included in the host package 340. The type of information and the format of the information contained in the host manifest 346 may be dictated by an operating system or platform or a developer of the operating system or platform.

The host manifest 346 may include a host identity 348. The host identity 348 may be information that identifies the host package 340. The host identity 348 may include a name, a publisher, and a version. The host identity 348 may include an OID. The host identity 348 may be different from a client identity of a client package that depends on the host package 340. The host identity 348 may be unique as compared to all other OIDs identifying objects and entities on a device on which the host package 340 resides. An operating system may use the host identity 348 to manage and track the host package 340.

The host manifest 346 may specify capabilities 350 of the host package 340. The capabilities 350 may indicate that the host package 340 has access to certain functions of an operating system, platform, or device (such as the device 102). For example, assume that the executable 344b tries to access a function of the operating system. The operating system may grant the executable 344b access to the function only if the capabilities 350 indicate that the host package 340 has access to the function. The functions may include placing an icon on a home screen, providing notifications, or accessing a camera. The developer of the operating system may control access to the capabilities 350. The capabilities 350 may be a custom hash that a developer of the host package 340 must obtain from the developer of the operating system and include in the host manifest 346. Use of the capabilities 350 may require user consent.

The capabilities 350 may include a host capability 352. The host capability 352 may indicate that the host package 340 may generate a client package. The host capability 352 may indicate that a client package may depend on the host package 340. The host capability 352 may be required for the system to register a client package that declares a dependency on the host package 340. The host capability 352 may be a custom hash that the developer of the host package 340 must obtain from the developer of the operating system in order to include it in the host manifest 346. The operating system developer may share the host capability 352 only with trusted developers. Requiring the host capability 352 may be one way the developer of the operating system addresses security concerns about allowing an unsigned client package to access operating system functions through the host package 340.

The capabilities 350 may also include an ability to install and uninstall (or cause the operating system to install or uninstall) all packages and applications that depend on the host package 340. When a client package or application that depends on the host package 340 is uninstalled, the host package 340 may be responsible for cleaning up artifacts of the client package or application.

The host manifest 346 may include a host runtime 354. The host runtime 354 may be information and functionality that applications other than applications included in the host package 340 can access. The host runtime 354 may be an extension. The host runtime 354 may include activation information 360. The activation information 360 may describe what a system should do when the host runtime 354 is invoked. The activation information 360 may reference an executable, such as the executable 344b. Activation information may also reference multiple executables. The activation information 360 may specify that the executable 344b should be executed upon invoking the host runtime 354. Although the host manifest 346 includes only the host runtime 354, in other designs a host manifest may include multiple host runtimes. Each host runtime may have a unique identity.

The host runtime 354 may have a host runtime identity 356. The host runtime identity 356 may include information that identifies the host runtime 354. The host runtime identity 356 may be a way to reference the host runtime 354. The host runtime identity 356 may include an OID for the host runtime 354. The host runtime identity 356 may be different from an application identity of an application included in a client package that depends on the host package 340. The host runtime identity 356 may be unique as compared to all other OIDs identifying objects and entities on a device on which the host package 340 resides. A client package may use the host runtime identity 356 to reference the host runtime 354.

The host runtime 354 may have a trust level 358. The trust level 358 may indicate a level of trust an operating system has with respect to the host package 340 or the host runtime 354. An operating system may refuse to register a client package that depends on the host package 340 if the trust level 358 of the host package 340 is not equal to or greater than a predefined level.

Updating the host package 340 may involve terminating all applications that depend on the host package 340. Updating the host package 340 may involve preventing all applications that depend on the host package 340 from executing while the host package 340 is being updated. These requirements may apply when the host package 340 is lifetime managed.

Figure 4:
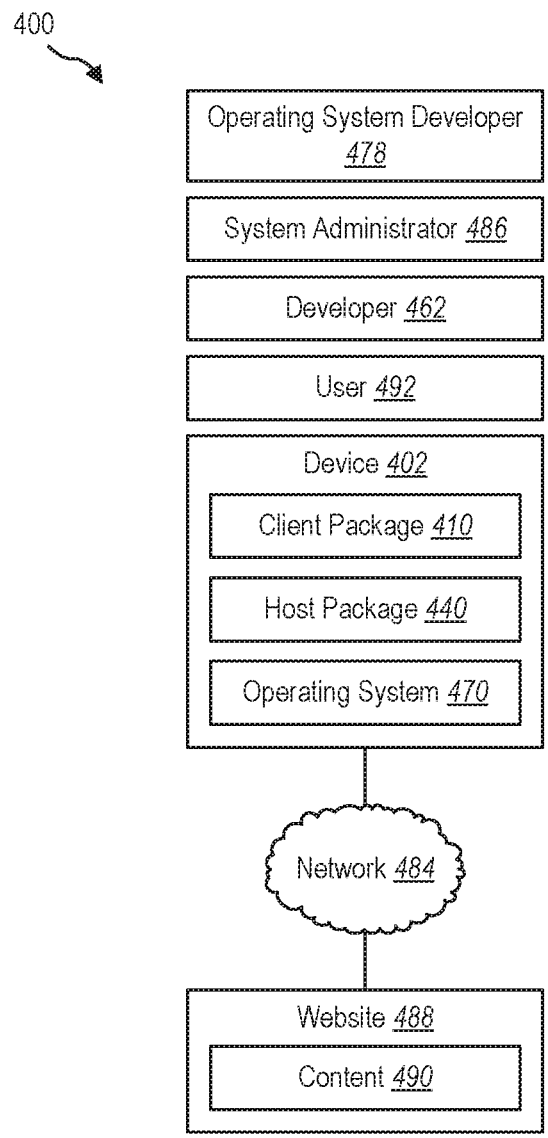
FIG. 4 illustrates an example system for generating and registering a client package in accordance with the present disclosure.

FIG. 4 illustrates an example of a system 400 in accordance with the present disclosure. The system 400 may include an operating system developer 478, a developer 462, a system administrator 486, a device 402, a user 492, a network 484, and a website 488.

The device 402 may include hardware and software. The device 402 may include an operating system 470, a host package 440, and a client package 410. The operating system developer 478 may have generated the operating system 470. The operating system 470 may be software that manages hardware and software of the device 402. The operating system developer 478 may be the source of the device 402.

The host package 440 may be a set of files and data. The host package 440 may be registered with the operating system 470. The host package 440 may be signed, and the operating system 470 may have authenticated the host package 440 before registering the host package 440. The host package 440 may have been downloaded to the device 402 after the user 492 obtained the device 402. In the alternative, the host package 440 may reside on the device 402 at the time the user 492 obtains the device 402. The operating system developer 478 may have generated the host package 440. In the alternative, the developer 462 may have generated the host package 440. In either case, the operating system developer 478 and the developer 462 may have signed the host package 440 before distributing the host package 440 and before the host package 440 came to reside on the device 402.

The host package 440 may include one or more applications. The one or more applications may enable the user 492 of the device 402 to perform tasks. The host package 440 may interact with the operating system 470 during runtime in order to perform the tasks. The host package 440 may include a host runtime that applications not included in the host package 440 can gain access to and use. The host runtime may reference an executable contained in the host package.

The client package 410 may be unsigned and depend on the host package 440. The client package 410 may not include any executable files. The client package 410 may include a client application. When activated, the client application may invoke the host runtime. The client application may be limited to the functionality of the host runtime and the host package 440. The client package 410 may, however, include content files not included in the host package 440. The client application may invoke the host runtime using a client application identity of the client application. And the executable referenced by the host runtime may use the content files included in the client package 410 during runtime. Thus, the client application may provide the user access to different content and allow the user to perform different tasks than the user could access and perform using the one or more applications included in the host package 440.

The system administrator 486 may have generated the client package 410. The system administrator 486 may have generated the client package 410 after the host package 440 was registered with the device 402. The system administrator 486 may have generated the client package 410 based on particular needs of the user 492 of the device 402. The client package 410 may act to customize the experience of the user 492 with one or more applications included in the host package 440 or with the device 402. The system administrator 486 may not have access to a certificate to sign the client package 410.

In the alternative, the developer 462 may have generated the client package 410. The developer 462 may have generated the client package 410 after the host package 440 was signed. The developer 462, which may not have developed the host package 440, may not have access to a certificate to sign the client package 410.

In the alternative, a host application included in the host package 440 may have generated the client package 410. The host application may have generated the client package 410 during a runtime of the host application. For example, the host application may be a web browser. During a runtime of the web browser, the user may use the web browser to access a website 488. The website 488 may include content 490. The user 492 may want to have access to the content 490 of the website 488 when the device 402 does not have access to the network 484. The web browser may generate the client package 410 based on the website 488 and the content 490.

In the alternative, the user 492 may have generated the client package 410.

Figure 5:
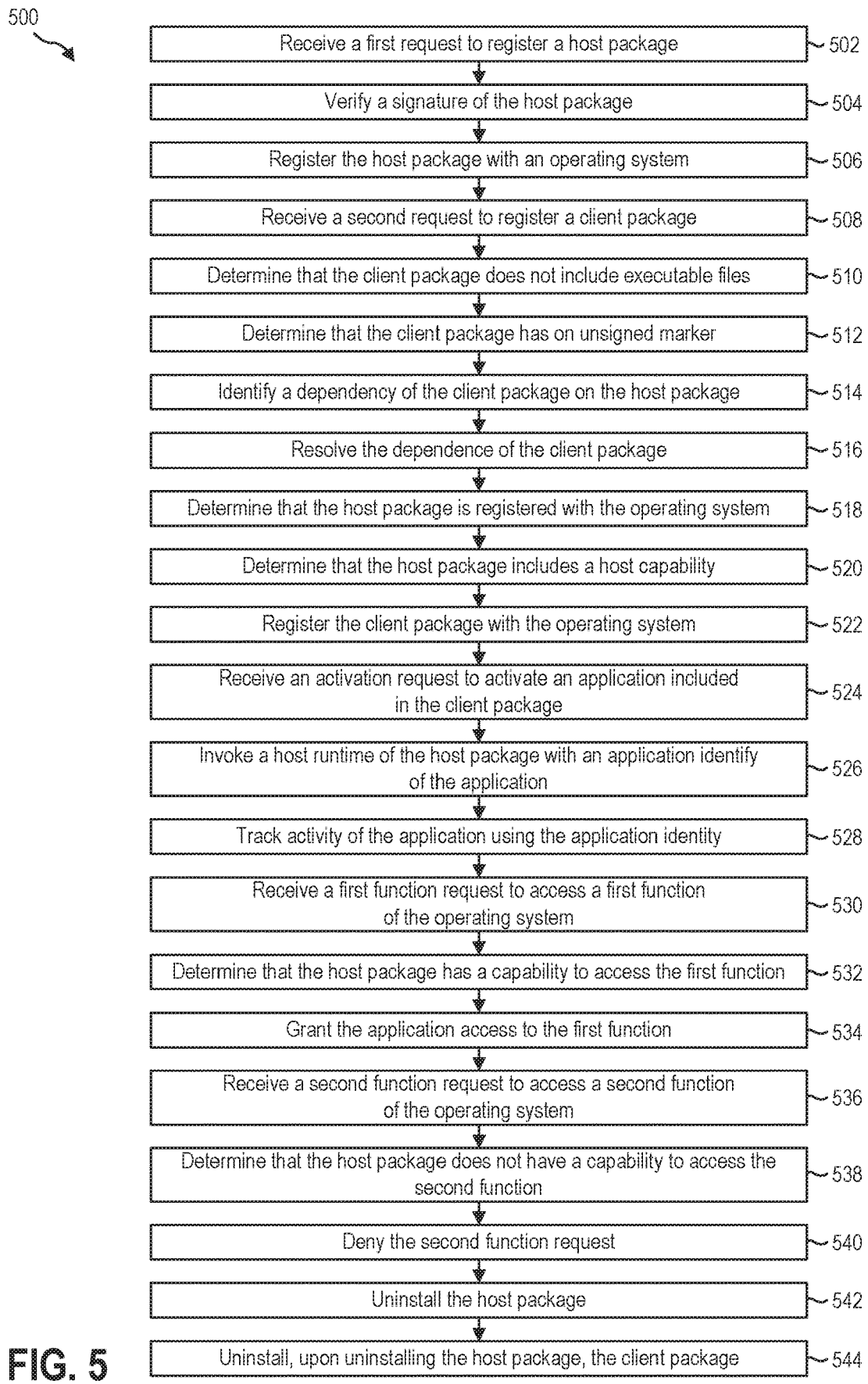
FIG. 5 illustrates an example method for registering a client package with an operating system in accordance with the present disclosure.

FIG. 5 illustrates a method 500 for registering an unsigned package with an operating system. For the sake of clarity, the method will be described in relation to the systems, devices, components, and data described previously.

The method 500 may include receiving 502 a first request to register a host package. The host package may make the first request to an operating system, such as the operating system 170. The host package may be the host package 140 or the host package 340. A developer may have generated the host package. The first request to register the host package may be a request for the operating system to recognize the host package, record information about the host package, and allow applications included in the host package to run on a device on which the operating system resides. The first request to register the host package may be a request to link the host package with a particular user.

The method 500 may include verifying 504 a signature of the host package. The signature may be the signature 142 or the signature 342. The signature may have been generated using a private key that is not generally available and is not included in the host package. The private key may have been generated by an operating system developer. The operating system developer may share the private key only with trusted developers. The operating system may verify 504 the signature of the host package using a public key. Verifying 504 the signature of the host package may indicate that the host package is authentic and has not been modified since the signature was generated. Verifying 504 the signature of the host package may provide some assurance that the host package was created by a trusted developer and is not malicious.

The method 500 may include registering 506 the host package with an operating system. The operating system may be the operating system 170.

Registering 506 the host package with the operating system may include recording information about the host package. Registering 506 the host package with the operating system may include granting the host package permission to run on the device. Registering 506 the host package with the operating system may include associating the host package with a particular user.

The method 500 may include receiving 508 a second request to register a client package. The client package may be the client package 110 or the client package 210. The operating system may receive 508 the second request. The operating system may receive 508 the second request from the host package or from the client package. The client package may not include a signature. The client package may not provide a way to authenticate the client package. The second request to register the client package may be a request for the operating system to recognize the client package, record information about the client package, and allow applications included in the client package to run on the device. The second request to register the client package may be a request to link the client package with a particular user.

The method 500 may include determining 510 that the client package does not include executable files. Determining 510 that the client package does not include executable files may further include determining that the client package does not include extensions referencing binaries or classes other than the host package or the host runtime. Executable files may include dynamic link library files.

The method 500 may include determining 512 that the client package has an unsigned marker. The unsigned marker may be the unsigned marker 226. Determining 512 that the client package has an unsigned marker may include determining that the client package includes a constant with a value set by an operating system developer.

The method 500 may include identifying 514 a dependency of the client package on the host package. The dependency may be the dependency 116 or the dependency 216. The dependency may identify the host package. The dependency may include criteria, such as the criteria 232.

The method 500 may include resolving 516 the dependency of the client package. Resolving 516 the dependency of the client package may include identifying the host package. Resolving 516 the dependency of the client package may include determining that the host package satisfies the criteria included in the host package.

The method 500 may include determining 518 that the host package is registered with the operating system. Being registered with the operating system may mean that information about the host package has been recorded. It may also mean that the host package has been linked with a particular user. It may also mean that the host package is permitted to run on a device.

The method 500 may include determining 520 that the host package includes a host capability. The host capability may be the host capability 352. The host capability may indicate that the host package has permission from the operating system to serve as a host to client packages. An operating system developer may provide the host capability to only trusted developers. In the alternative, the method 500 may include determining that the host package has a trust level equal to or greater than a predetermined trust level.

The method 500 may include registering 522 the client package with the operating system. Registering 522 the client package with the operating system may include recording information about the client package. Registering 522 the client package with the operating system may include granting the client package permission to run on the device. Registering 522 the client package with the operating system may include associating the client package with a particular user.

The method 500 may include receiving 524 an activation request to activate an application included in the client package. The application may be the application 120 or the application 220. The activation request may result from a user directly initiating the application. The activation request may result from the user indirectly initiating the application, such as by opening a type of file that cannot be viewed without the application.

The method 500 may include invoking 526 a host runtime of the host package with an application identity of the application. The application may include a reference to the host runtime. The host runtime may be the host runtime 154 or the host runtime 354. The host runtime may include activation information. The host runtime may reference an executable included in the host package. Invoking 526 the host runtime of the host package may include executing the executable referenced in the host runtime.

The method 500 may include tracking 528 activity of the application using the application identity. The operating system may track 528 the activity of the application using the application identity. Tracking 528 the activity of the application using the application identity may include tracking the activity of the executable. Even though the executable is included in the host package (and not the client package), the operating system may be able to associate the activity of the executable with the application because the host runtime is invoked with the application identity.

The method 500 may include receiving 530 a first function request to access a first function of the operating system. The first function may be one of the functions 174. The operating system may receive 530 the first function request. The operating system may receive 530 the first function request from the application. The first function may involve access to a hardware element (such as a camera or a microphone) of the device on which the operating system resides. The first function may involve access to a system file (such as the file that controls the images that appear on a home screen of the device) or system functionality (such as sending notifications). The operating system may restrict access to the first function.

The method 500 may include determining 532 that the host package has a capability to access the first function. The capability may be one of the capabilities 350. The operating system may determine 532 that the host package has the capability to access the first function.

The method 500 may include granting 534 the application access to the first function. The operating system may grant 534 the application access to the first function.

The method 500 may include receiving 536 a second function request to access a second function of the operating system. The second function may be one of the functions 174. The operating system may receive 536 the second function request. The second function request may come from the application. The second function may be different from the first function.

The method 500 may include determining 538 that the host package does not have a capability to access the second function.

The method 500 may include denying 540 the second function request.

The method 500 may include uninstalling 542 the host package. Uninstalling 542 the host package may include de-registering the host package.

The method 500 may include uninstalling 544, upon uninstalling the host package, the client package. Uninstalling 544 the client package may include de-registering the client package. Uninstalling 544 may include uninstalling all client packages that depend on the host package. In other designs, the client package may not be uninstalled upon uninstalling the host package. Instead, the client package may remain on the system but a status of the client package may be changed to broken, disabled, not runnable, or as needing attention.

Figure 6:
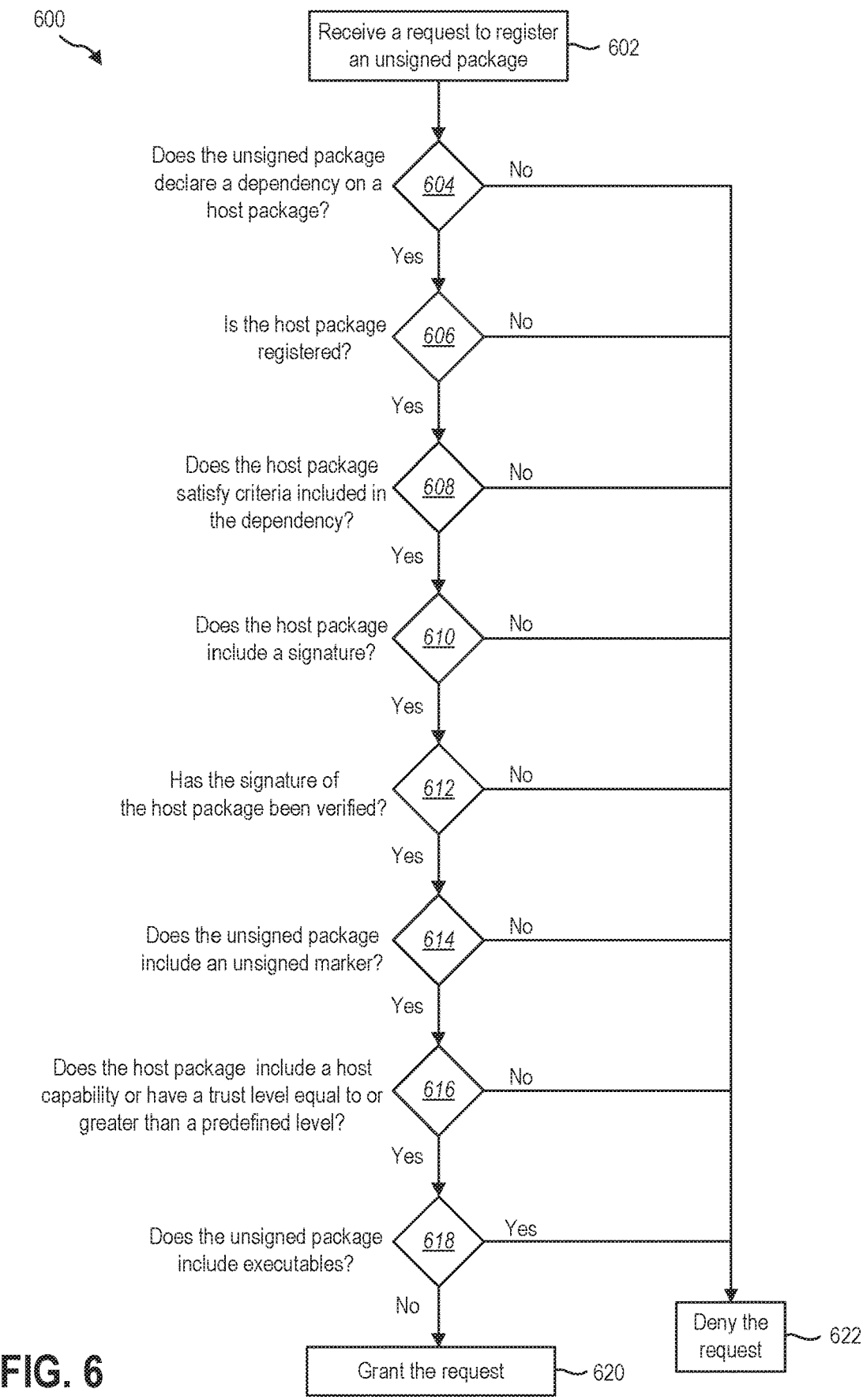
FIG. 6 illustrates an example method for processing a request to register an unsigned package in accordance with the present disclosure.

FIG. 6 illustrates a method 600 for registering an unsigned package. For the sake of clarity, the method will be described in relation to the systems, devices, components, and data described previously.

The method 600 may include receiving 602 a request to register an unsigned package. An operating system (such as the operating system 170) may receive 602 the request. The unsigned package may be the client package 110 or the client package 210. The unsigned package may make the request to register the unsigned package. In the alternative, a host package (such as the host package 140 or the host package 340) may make the request.

The method 600 may include determining 604 whether the unsigned package declares a dependency on a host package. The dependency may identify the host package. The dependency may be the dependency 116 or the dependency 216. If the unsigned package does not declare the dependency on the host package, the method 600 may include denying 622 the request.

The method 600 may include determining 606 whether the host package is registered. Determining 606 whether the host package is registered may include determining 606 whether the host package is registered with the operating system. If the host package is not registered, the method 600 may include denying 622 the request.

The method 600 may include determining 608 whether the host package satisfies criteria included in the dependency. The criteria may be the criteria 232. If the host package does not satisfy the criteria, the method 600 may include denying 622 the request.

The method 600 may include determining 610 whether the host package includes a signature. The signature may be the signature 142 or the signature 342. If the host package does not include the signature, the method 600 may include denying 622 the request.

The method 600 may include determining 612 whether the signature of the host package has been verified. If the signature of the host package has not or cannot be verified, the method 600 may include denying 622 the request.

The method 600 may include determining 614 whether the unsigned package includes an unsigned marker. If the unsigned package does not include the unsigned marker, the method 600 may include denying 622 the request.

The method 600 may include determining 616 whether the host package includes a host capability or has a trust level equal to or greater than a predefined level. If the host package does not include the host capability or does not have a trust level equal to or greater than a predefined level, the method 600 may include denying 622 the request.

The method 600 may include determining 618 whether the unsigned package includes any executables. If the unsigned package includes any executables, the method 600 may include denying 622 the request.

The method 600 may include granting 620 the request. The operating system may grant 620 the request. Although granting 620 the request is shown to occur only once all the conditions shown are satisfied, the method 600 may include granting 620 the request when fewer than all the conditions shown are satisfied. For example, in some designs, the method 600 may grant a request to register a client package even if the client package does not declare a dependency or declares a dependency that cannot be resolved. In those situations, the client package may be able to register with the operating system but may not be able to use functionality and capabilities of a host package. In other designs, granting 620 the request may also require that additional conditions be satisfied. For example, the method 600 may require that there be no conflict among the identities of the unsigned package, any applications described in the unsigned package, the host package, and any applications or host runtimes described in the host package.

The method 600 may include denying 622 the request. The operating system may deny 622 the request. Although denying 622 the request is shown to occur when any of the conditions shown are not satisfied, denying 622 the request may require that two or more of the conditions shown not be satisfied.

Figure 7:
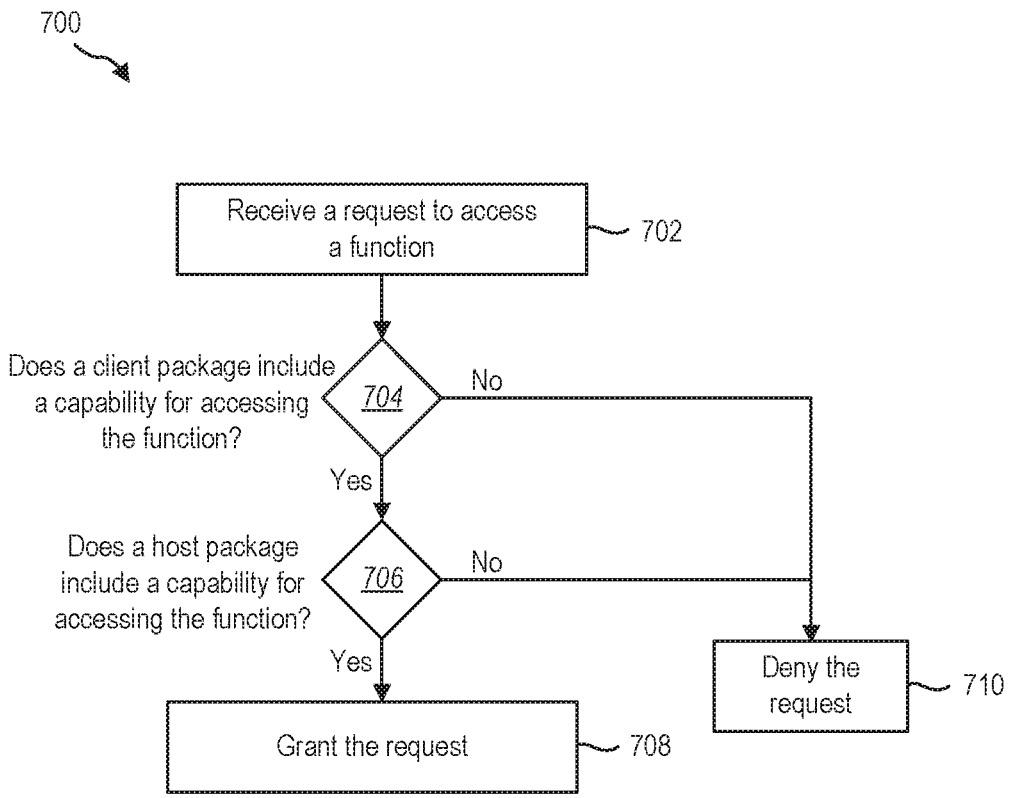
FIG. 7 illustrates an example method for processing a request to access a function in accordance with the present disclosure.

FIG. 7 illustrates a method 700 for granting access to a function. For the sake of clarity, the method will be described in relation to the systems, devices, components, and data described previously.

The method 700 may include receiving 702 a request to access a function. An operating system may receive 702 the request to access the function. The operating system may receive 702 the request to access the function from an unsigned package or an application contained in an unsigned package. The operating system may receive 702 the request from a host runtime or an executable included in a host package operating with an application identity of the application contained in the unsigned package. The function may be one of the functions 174. The function may involve access to a hardware element of a device on which the operating system resides.

The method 700 may include determining 704 whether a client package includes a capability for accessing the function. The client package may be an unsigned package such as the client package 110 or the client package 210. If the client package does not include the capability for accessing the function, the method 700 may include denying 710 the request.

The method 700 may include determining 706 whether a host package includes a capability for accessing the function. The host package may include a signature, such as the signature 142 or the signature 342. The host package may be the host package 140 or the host package 340. The client package may include a dependency on the host package. If the host package does not include the capability for accessing the function, the method 700 may include denying 710 the request.

The method 700 may include granting 708 the request. The operating system may grant 708 the request. Although granting 708 the request is shown to occur only once all the conditions shown are satisfied, the method 700 may include granting 708 the request when fewer than all or even when none of the conditions shown are satisfied. In other designs, granting 708 the request may also require that additional conditions be satisfied. As noted previously, the operating system may use various rules to determine whether the client package has access to a capability for the function. Those rules include the intersection rule, the union rule, the host-restricted rule, and the client-declared rule. As explained previously, those rules may be used together. Granting a request to access a function may involve use of any one or more of those rules or other rules known in the art.

The method 700 may include denying 710 the request. The operating system may deny 710 the request. Although denying 710 the request is shown to occur when any of the conditions shown are not satisfied, denying 710 the request may require that all the conditions shown not be satisfied.

Figure 8:
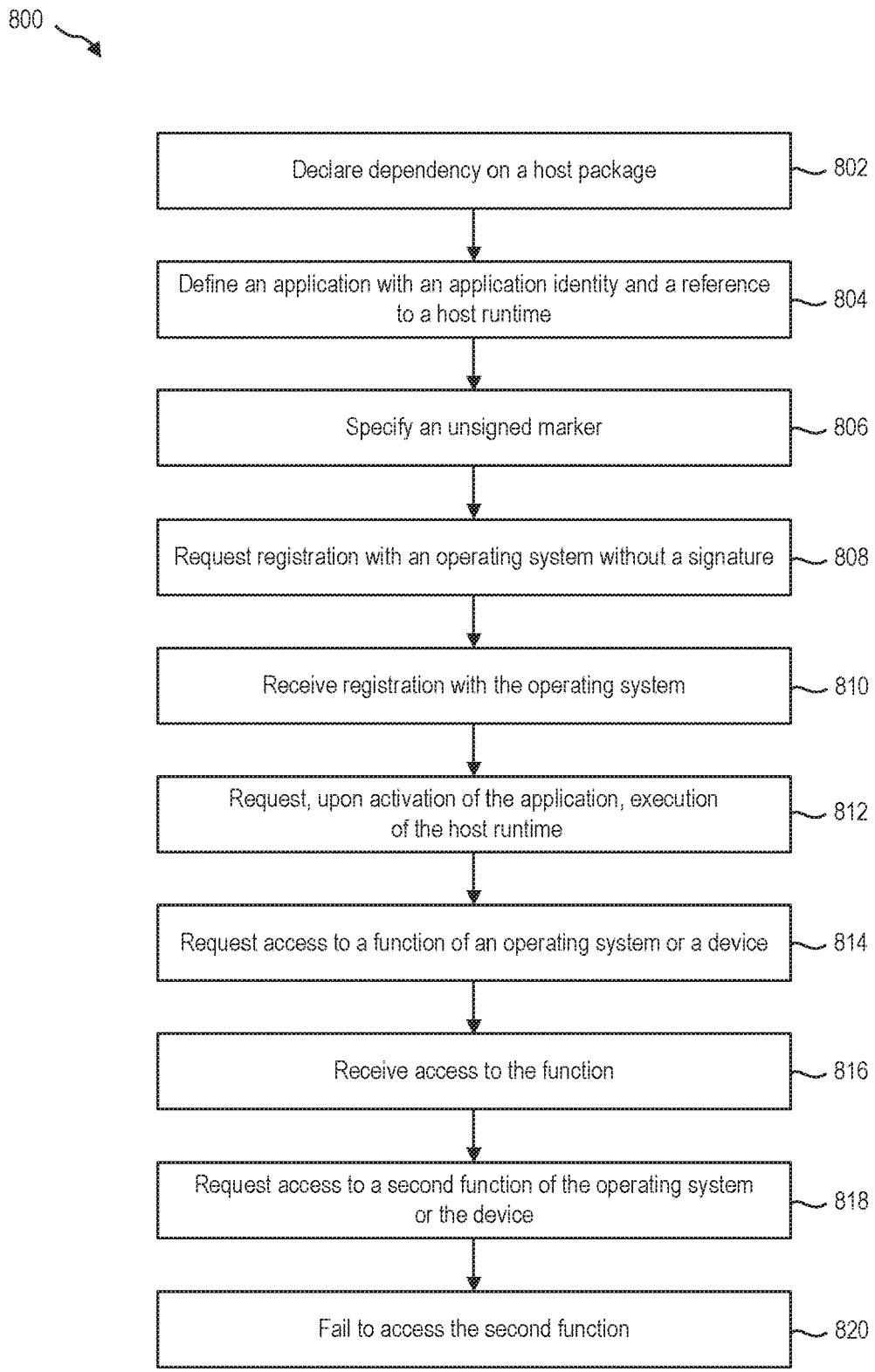
FIG. 8 illustrates an example method for accessing a function of an operating system in accordance with the present disclosure.

FIG. 8 illustrates a method 800 for requesting access to a function of an operating system. For the sake of clarity, the method will be described in relation to the systems, devices, components, and data described previously.

The method 800 may include declaring 802 a dependency on a host package. The dependency may be the dependency 116 or the dependency 216. The host package may be the host package 140 or the host package 340.

The method 800 may include defining 804 an application with an application identity and a reference to a host runtime. The application may be the application 120 or the application 220. The application identity may be the application identity 222. The host runtime may be the host runtime 154 or the host runtime 354.

The method 800 may include specifying 806 an unsigned marker. The unsigned marker may be the unsigned marker 226.

The method 800 may include requesting 808 registration with an operating system without a signature. The requesting 808 may be done by the client package 110 or the client package 210. The requesting 808 may be done by a host package on behalf of a client package. The operating system may be the operating system 170.

The method 800 may include receiving 810 registration with the operating system.

The method 800 may include requesting 812, upon activation of the application, execution of the host runtime. The requesting 812 may be done by the application. The host runtime may be included in a host package.

The method 800 may include requesting 814 access to a function of the operating system or a device. The requesting 814 may be done by the application included in the client package. The operating system may receive the request for access to the function.

The method 800 may include receiving 816 access to the function. The receiving 816 may be done by the application included in the client package.

The method 800 may include requesting 818 access to a second function of the operating system or the device. The requesting 818 may be done by the application included in the client package. The operating system may receive the request for access to the second function.

The method 800 may include failing 820 to access the second function. The operating system may deny the request for access to the second function.

Figure 9:
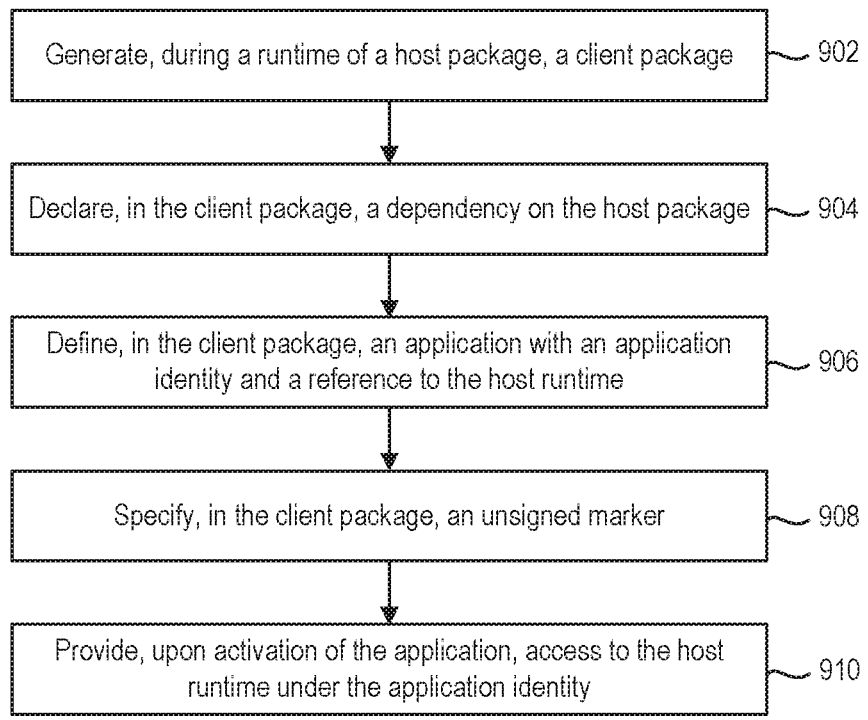
FIG. 9 illustrates an example method for generating a client package in accordance with the present disclosure.

FIG. 9 illustrates a method 900 for generating a client package. For the sake of clarity, the method will be described in relation to the systems, devices, components, and data described previously.

The method 900 may include generating 902, during a runtime of a host package, a client package. The host package may be the host package 140 or the host package 340. The client package may be the client package 110 or the client package 210. The host package may include a signature. The client package may not include a signature. The host package may generate 902 the client package.

The method 900 may include declaring 904, in the client package, a dependency on the host package. The dependency may be the dependency 116 or the dependency 216.

The method 900 may include defining 906, in the client package, an application with an application identity and a reference to a host runtime. The application may be the application 120 or the application 220. The host runtime may be the host runtime 154 or the host runtime 354.

The method 900 may include specifying 908, in the client package, an unsigned marker. The unsigned marker may be the unsigned marker 226.

The method 900 may include providing 910, upon activation of the application, access to the host runtime under the application identity. The host package may provide access to the host runtime.

Figure 10:
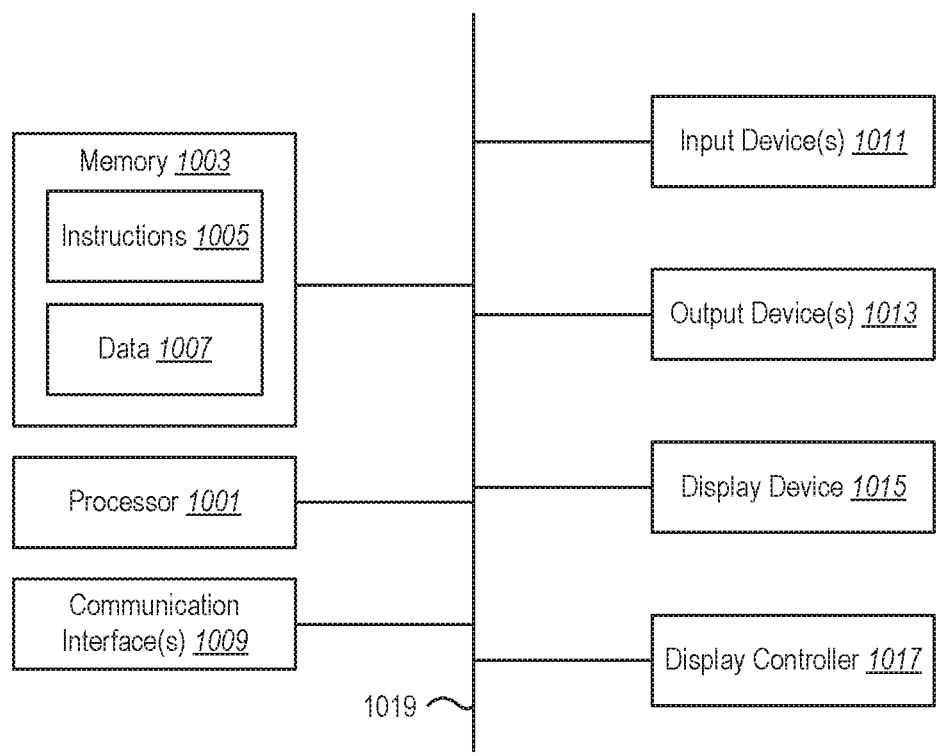
FIG. 10 illustrates certain components that may be included in a computing system.

FIG. 10 illustrates certain components that may be included within a computer system 1000. One or more computer systems 1000 may be used to implement the various devices, components, and systems described herein. For example, the device 102 may be implemented using the computer system 1000.

The computer system 1000 includes a processor 1001. The processor 1001 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information (such as the client package 110, the host package 140, and the operating system 170). For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules, components, packages, applications, and operating systems described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A non-transitory computer-readable medium comprising instructions that are executable by one or more processors to cause a computing system to:
   receive a request to register a client package, wherein the client package is unsigned and specifies a dependency identifying a host package, wherein the host package is signed and includes an executable, wherein the host package is registered with an operating system, wherein the host package has access to a function of the operating system, and wherein the dependency identifying the host package includes at least one of a name, a version, a publisher, or an author of the host package;
   register, by the operating system, the client package based on at least a determination that the dependency identifying the host package is satisfied;
   receive a request to activate an application included in the client package;
   cause, upon receiving the request, execution of the executable; and
   grant the application access to the function of the operating system.

2. The computer-readable medium of claim 1, wherein the application has an application identity and the execution of the executable is done using the application identity.

3. The computer-readable medium of claim 2, wherein the application identity does not conflict with a host identity of the host package.

4. The computer-readable medium of claim 2, further comprising additional instructions that are executable by the one or more processors to cause the computing system to: track, upon the execution of the executable, activity of the application and the executable using the application identity.

5. The computer-readable medium of claim 1, wherein the client package includes an unsigned marker and the unsigned marker is required for the operating system to register an unsigned package.

6. The computer-readable medium of claim 1, further comprising additional instructions that are executable by the one or more processors to cause the computing system to:
   receive, from the application, a second request to access a second function of the operating system, wherein the host package does not have access to the second function; and
   deny the application access to the second function.

7. The computer-readable medium of claim 1, further comprising additional instructions that are executable by the one or more processors to cause the computing system to:
   uninstall, by the operating system, the host package; and
   uninstall, upon the uninstalling the host package, the client package.

8. The computer-readable medium of claim 1, wherein the client package was created by a second application included in the host package.

9. The computer-readable medium of claim 8, wherein the host package includes a host capability and the host capability is required for the operating system to register the client package.

10. The computer-readable medium of claim 1, wherein the client package was created by a developer or a system administrator after the host package was signed.

11. The computer-readable medium of claim 1, further comprising additional instructions that are executable by the one or more processors to cause the computing system to: determine that the host package satisfies criteria, wherein the criteria are included in the dependency specified in the client package.

12. The computer-readable medium of claim 1, wherein the client package does not contain executable files or references to binaries or classes other than the host package.

13. A computing system comprising one or more processors, and memory comprising instructions executable by the one or more processors to cause the one or more processors to:
   request, upon activation of an application, execution of an executable with an application identity of the application, wherein the executable is included in a host package and the application is included in a client package, wherein the host package is signed and includes a host identity, wherein the host package is registered with an operating system and includes a capability that allows access to a function of the operating system, wherein the client package is unsigned and declares a dependency identifying the host package, wherein the dependency identifying the host package includes at least one of a name, a version, a publisher, or an author of the host package, wherein the client package is registered based on at least a determination that the dependency identifying the host package is satisfied, and wherein the application identity is distinct from the host identity; and receive, during a runtime of the application, access to the function of the operating system.

14. The computing system of claim 13, further comprising additional instructions that are executable by the one or more processors to cause the computing system to: request registration of the client package with the operating system, wherein the host package includes a host capability and wherein the host capability is required for the client package to be registered with the operating system.

15. The computing system of claim 14, wherein the client package includes an unsigned marker and wherein the unsigned marker is required for the registration of the client package with the operating system.

16. The computing system of claim 13, further comprising additional instructions that are executable by the one or more processors to cause the computing system to: fail to receive access to a second function of the operating system, wherein the host package does not have access to the second function of the operating system.

17. The computing system of claim 13, wherein the host package causes the client package to be uninstalled.

18. A method comprising:

receiving, by a processor, a request to register a client package, wherein the client package is unsigned and specifies a dependency identifying a host package, wherein the host package is signed and includes an executable, wherein the host package is registered with an operating system, wherein the host package has access to a function of the operating system, and wherein the dependency identifying the host package includes at least one of a name, a version, a publisher, or an author of the host package;

registering, by the operating system, the client package based on at least a determination that the dependency identifying the host package is satisfied;

receiving, by the processor, a request to activate an application included in the client package;

causing, by the processor, upon receiving the request, execution of the executable; and granting, by the processor, the application access to the function of the operating system.

19. The method of claim 18, wherein the application has an application identity and the execution of the executable is done using the application identity.

20. The method of claim 19, wherein the application identity does not conflict with a host identity of the host package.

* * * * *